US007502994B2

(12) United States Patent
Kocol

(10) Patent No.: US 7,502,994 B2
(45) Date of Patent: Mar. 10, 2009

(54) WEB PAGE LINK-TRACKING SYSTEM

(75) Inventor: Bryan Kocol, San Diego, CA (US)

(73) Assignee: Omniture, Inc., Orem, UT (US)

( * ) Notice: Subject to any disclaimer, the term of this patent is extended or adjusted under 35 U.S.C. 154(b) by 61 days.

(21) Appl. No.: 10/072,037

(22) Filed: Feb. 5, 2002

(65) Prior Publication Data
US 2002/0116494 A1    Aug. 22, 2002

Related U.S. Application Data

(60) Provisional application No. 60/266,723, filed on Feb. 5, 2001.

(51) Int. Cl.
G06F 17/00 (2006.01)
G06Q 30/00 (2006.01)
(52) U.S. Cl. .................. 715/205; 715/208; 709/224; 705/14
(58) Field of Classification Search ............ 715/501.1, 715/530, 205, 208, 206, 207; 709/223, 224, 709/226; 705/14, 1; 707/100, 104.1
See application file for complete search history.

(56) References Cited

U.S. PATENT DOCUMENTS

| | | | | | |
|---|---|---|---|---|---|
| 5,963,915 | A | * | 10/1999 | Kirsch | ................... 705/26 |
| 6,009,429 | A | * | 12/1999 | Greer et al. | ............... 707/10 |
| 6,122,672 | A | * | 9/2000 | Vyaznikov et al. | ....... 709/238 |
| 6,268,856 | B1 | * | 7/2001 | Bruck et al. | ............ 715/733 |
| 6,578,078 | B1 | * | 6/2003 | Smith et al. | ............. 709/224 |
| 6,823,490 | B1 | * | 11/2004 | Dauerer et al. | ............. 715/513 |
| 6,859,833 | B2 | * | 2/2005 | Kirsch et al. | ............... 709/224 |
| 7,076,546 | B1 | * | 7/2006 | Bates et al. | ................ 709/224 |
| 7,136,849 | B2 | * | 11/2006 | Patrick | ......................... 707/3 |
| 2002/0010742 | A1 | * | 1/2002 | Kihara et al. | ............. 709/204 |
| 2002/0029290 | A1 | * | 3/2002 | Burema et al. | ............ 709/238 |
| 2002/0054126 | A1 | * | 5/2002 | Gamon | ...................... 345/781 |
| 2002/0078191 | A1 | * | 6/2002 | Lorenz | ...................... 709/223 |
| 2002/0103664 | A1 | * | 8/2002 | Olsson et al. | ................. 705/1 |
| 2002/0147805 | A1 | * | 10/2002 | Leshem et al. | ............. 709/223 |
| 2003/0014262 | A1 | * | 1/2003 | Kim | ......................... 704/278 |
| 2003/0236701 | A1 | * | 12/2003 | Rowney et al. | .............. 705/14 |
| 2004/0103426 | A1 | * | 5/2004 | Ludvig et al. | .................. 725/9 |
| 2005/0044139 | A1 | * | 2/2005 | Christian et al. | ........... 709/203 |
| 2005/0114511 | A1 | * | 5/2005 | Davis et al. | ............... 709/226 |
| 2006/0136586 | A1 | * | 6/2006 | Johnson et al. | ............ 709/224 |
| 2007/0050257 | A1 | * | 3/2007 | Fine et al. | ..................... 705/14 |

* cited by examiner

Primary Examiner—Adam L Basehoar
(74) Attorney, Agent, or Firm—Pattric J. Rawlins; Procopio, Cory, Hargreaves & Savitch LLP

(57) ABSTRACT

A link-tracking server receives a request for a Web page or an image and stores link-tracking information in one or more link-tracking files to create a record of link-tracking information. The link tracking files may later be accessed by a link-tracking subscriber, such as by logging onto the link-tracking server. A content provider embeds link-tracking code in each Web page where link-tracking information is desired to be captured. Such Web pages embedded with such link-tracking code are then stored in a content provider server, which then serves such tracking-enabled Web pages to users on the network. When a user requests a tracking-enabled page, the link-tracking code sends one or more requests to a link-tracking server to record link-tracking information.

17 Claims, 7 Drawing Sheets

FIG. 2A

```
1   <!-- BEGIN Event Tracking Code -->
2   <script language="javascript1.2">
3   function recordit(k, w)
4   //This function records the link.  Parameters k and w are passed.  K is the link and w is an array of stored
5   functions.
6   {
7       var gettext="NA";
8       //This initializes the variable used to hold the text that the link wrapped.
9       var iloc=0;
10      while (document.links[iloc]!=k){
11          iloc++;
12      }
13      //This is a loop which determines which element in the array the link that was passed.
14      if (w[iloc]){w[iloc]();}
15      //This checks to see if a function was stored for that link.  If so, it executes the stored function.
16      document.all?gettext=k.innerHTML:gettext=k.text;
17      //This sets the gettext variable to the text or html that was wrapped by the link.
18      document.images.hitboximage.src="http://ww3.hitbox.com/logs/log.cgi?link="+k.href+"&iloc="+iloc+"
19  &named="+gettext;
20      //This sends the link information back to the hitbox servers.
21  }
22
```

FIG. 2B

```
23  function initial()
24  //This function sets the onclick event for each link and stores prior events associated with it, if any.
25  {
26      var storef = Array(document.links.length);
27      //This array will store prior functions.
28      for (var i = 0; i < document.links.length; i++) {
29      //This loop runs through all the documents on a page.
30          if (document.links[i].onclick) storef[i]=document.links[i].onclick;}
31          //If a function is associated with that link it is stored in an array.
32          document.links[i].onclick = function (){
33              recordit(this, storef);
34              return true;
35              //Here is where the onclick event for each link is associated with the recordit function.
36          }
37      }
38  }
39  window.onload = initial;
40  //This starts the process when the window has loaded.
41  </script>
42
43  <IMG SRC="http://stats.hitbox.com/buttons/ct0.gif" HEIGHT=68 WIDTH=82 BORDER=0
44  NAME="hitboximage">
45  <!-- This is the initial image used to record a page view.
```

FIG. 4A

```
1   <script language="javascript1.2">
2   This code demonstrates how to record downloads and exit links using the invention.
3   _hbi=new Image();
4   _ot=0;
5   //Initializes variables.
6
7   function _gf(_x){
8   //This function retrieves the file or document name requested in a URL.
9       _ed = (_x.length);
10      _be = ((_x.lastIndexOf("/"))+1);
11      _fn = (_x.substring(_be,_ed));
12      return _fn;
13      }
14
15  function _sb(_k){
16  //This function checks to see if the link is an exit link.
17      eval("var _gt=/(\\w*\\.)*(\\w*\\.)/i;");
18      _gt.exec(location.hostname);
19      //This parses the link for domain name.
20      var _fr="co.com.org.net.";
21      if(_fr.indexOf(RegExp.$2)!=-1){
22          eval("var _uf=/((\\w*\\.)*(\\w*\\.)(\\w*\\.))/;");
23          _uf.exec(location.hostname);}
24      //This is additional checking in case the link is to a foreign domain.
25      if(_k.href.indexOf(RegExp.$2)==-1){_hbi.src="http://ehg.hitbox.com/HG?el="+escape(_k.href);}
26      //If the domain name is not the same as the current document, the information is sent back to the hitbox servers.
27      return true;
28      }
29
```

FIG. 4B

```
30  function _ri(_k,_w){
31  //This function recieves the link and checks if it is a download. Parameters _k and _w are passed. _k is the
32  link and _w is an array of stored functions.
33      var _ilc=0;
34      while(document.links[_ilc]!=_k){_ilc++;}
35      if(_w[_ilc]){_w[_ilc]();}
36      //This is a loop which determines which element in the array the link that was passed.
37      _fl=_gf(_k.pathname);
38      //Sets variable _fl to the file or document name in the link.
39      if(_fl!=""){
40      //Checks if name exists
41          var _pt=new RegExp("\..?html?|\.asp|\.cfm|\.jsp|\.cgi|\.php[3-4]?|\.pl|\.taf|\.dll","i");
42          if(!_pt.test(_fl)){
43          //Checks to see if file extension is a among a list of known HTML-types.
44              hbi.src="http://ehg.hitbox.com/HG?fm="+escape(_fl);}
45          //If the file is not among that list, the file information is sent back to the hitbox servers.
46          else{
47              _sb(_k);}}
48          //If info was not sent back to hitbox server, it checks for exit links.
49      else{
50          _sb(_k);
51          //If info was not sent back to hitbox server, it checks for exit links.
52      }
53      return true;
54  }
```

FIG. 4C

```
56  function _it(){
57  //This function sets the onclick event for each link and stores prior events associated with it, if any.
58  if(_ot==1)_wo();
59  //If an onload event was previously set, executes it now.
60  var _sf=new Array(document.links.length);
61  //This array will store prior functions.
62  for(var i=0;i<document.links.length;i++){
63  _rv="true";
64  if(document.links[i].onclick){
65  //This loop runs through all the documents on a page.
66  _sf[i]=document.links[i].onclick;
67  //If a function is associated with that link it is stored in an array.
68  if(_sf[i].toString().indexOf("return false")!=-1)_rv="false";
69  //If the return value of the stored function is false, the return value for the new function is
    set to false.
70  }
71  eval("document.links[i].onclick=function(){_ri(this,_sf);return ''+_rv+'';}");
72  //Here is where the onclick event for each link is associated with the _ri function.
73  }
74  if(window.onload){_wo=window.onload;_ot=1;};window.onload=_it;
75  //If a function is already associated with the window loading, it is stored and executed later.
76  }
77  </script>
```

WEB PAGE LINK-TRACKING SYSTEM

REFERENCE TO RELATED APPLICATIONS

This application claims priority of co-pending U.S. Provisional Patent Application Ser. No. 60/266,723 entitled "Web Page Link-Tracking System" by B. Kocol, filed Feb. 5, 2001. Priority of the filing date of Feb. 5, 2001 is hereby claimed, and the disclosure of said Provisional Patent Application is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

This invention relates generally to computer network communications and, more particularly, to the collection of information on Web site traffic.

2. Description of the Related Art

When a computer network user begins a communication session over the Internet, the user can request data files from an Internet-connected computer called a file server or Web server using the hypertext transfer protocol (HTTP). These data files comprise what are commonly referred to as Web pages or simply "pages". The Web pages are typically written in one or more types of programming code called hypertext mark-up language (HTML), extensible style sheet language (XSL), or extensible markup language (XML), and can be viewed or displayed through a graphical user interface (GUI) program called a browser, such as "Communicator" from Netscape Communications Corporation of Santa Clara, Calif., USA, or "Internet Explorer" from Microsoft Corporation of Redmond, Wash., USA. The network nodes and collection of such data files are commonly referred to as the "World Wide Web". A collection of related files under a common Internet network domain location or node is commonly referred to as a Web site. The files that are available at a Web site can include a mixture of text, image, video, and audio data.

A network user can request a Web site page by clicking on a link in the browser window or by typing in a uniform resource locator (URL) network address in the browser location toolbar. When a user makes a page request, the user's browser sends a request message from the user's browser to the Web site server, providing the Web site server with the URL of the requested page. So-called Internet "cookies" and header information may also be sent along with such a request. The cookies may be used to store information about the requesting user and may be used to keep track of pages requested by the user from the Web site server.

Typically, cookies are stored on the client system or computer, thus, when that user returns to the same Web site or Web page, the browser sends a copy of that cookie back to the server. When a user's browser requests a Web page from a server at a given domain, the browser also provides any cookies it has that originated from that domain. If the user's browser has no cookie to provide, then the server can provide one with the Web page data, which the user's browser will store. Thereafter, when the user's browser again requests a page from the Web site, that browser will automatically provide the stored cookie to the server, along with the browser request for the Web page.

Information may also be passed to the Web site server via parameters contained as part of the Web page URL address. For example, the URL http://www.URLAddress.com/x.cgi?account_no=123is a URL containing the parameter "account_no", with a value of 123, which is passed to the Web server as part of the URL request. The text string "account_no=123" is also sometimes referred to as a query string. Links or hyperlinks are elements in a Web page, such as one or more words, phrases, symbols, or images that enable a user to view another page by clicking on the link in the user's browser. Such a link may also be a link or hyperlink to enable the user to download a file for later viewing, rather than immediate viewing through the user's browser. Links that are images are often called banners. Links are generally coded with an anchor tag, which is an HTML data construct comprising a text string that specifies the URL address of the requested data file. For example, <a href="http://www.URLaddress.com/requestedpage.html">. . . </a>, is an anchor tag in which the requested page is referred to as "requestedpage.html" and is found at the URL domain name address of "www.URLaddress.com". Thus, the anchor tag specifies the domain name and page reference and thereby specifies the URL of the requested data file.

The Internet has become an important advertising medium for advertisers. Placing advertisements on Web pages, shown as banners or links on a page, assists in promoting products and services. Similarly, content service providers, who provide Web pages over the Internet, may obtain revenue from sponsoring advertisers by embedding links to the advertiser's page, thereby referring users to the advertiser's page. The popularity of this type of advertising is evinced by the proliferation of advertising banners on the Internet.

One goal of sponsoring advertisers is to place their advertisements on popular Web sites so their advertisements may be seen more often, as well as to increase the possibility of their advertisements being clicked or selected through such links. Some advertisers also use links to enable download of free copies of their software for a trial period. Content service providers are interested in keeping track of how many times an advertisement has been displayed and/or clicked to determine the appropriate fees to charge to an advertiser, as well as to calculate fees based on the number of times an advertisement has been clicked or displayed. There may be additional reasons for Web site operators to measure traffic, or page requests, such as to determine popularity relative to other Web sites. In addition to tracking page requests, it also is useful to track the referring source of a page request, that is, requests from particular links on a page. Tracking individual link referrals provides greater fidelity of Web traffic information, as to which links are creating the most referrals and therefore creating the most interest. Thus, there is a widespread desire for tracking the navigation of the Web by selection of links on Web sites.

Measures of advertising effectiveness or popularity include the links clicked on a Web page, the referring links (or entrance links) for a page request, the click-thru percentage (the percentage of times a link is displayed versus clicked), location of referring links within a Web page or window, the most popular text link in a Web page or Web site, banners clicked in a Web page or Web site, the number of times a file is downloaded, the types of files downloaded, and the like (hereafter collectively referred to as link-tracking information or surfing events). Tools used in determining the effectiveness of an advertisement and tools used to monitor such information can be difficult and time consuming to implement, and the cost for embedding links on a Web page can be relatively high due to modifications necessary to Web page code.

Web server software applications, such as "Internet Information Server" by Microsoft Corporation of Redmond, Wash., USA, or "Enterprise Server" by Netscape Communications Corporation of Santa Clara, Calif., USA, have the capability of recording Web surfing event information to log files. Such log files typically contain HTTP request date and time, the requested URL address (including query string, if applicable), network user's IP address, the referring Web page, HTTP version, and the like. The composition of information recorded or captured in a log file, however, is dependent on the Web server software. Several pieces of information related to link-tracking information, such as the most popular link in a Web page and the number of times a file is downloaded from a particular Web page, is not typically captured by the Web server software in its log file. This information would be useful in measuring Web traffic.

From the discussion above, it is apparent that there is a need for a link-tracking system that captures information related to links, that is easy to implement, and would involve very minimal changes or additions to existing or new Web sites. The present invention fulfills this need.

SUMMARY OF THE INVENTION

The present invention provides a link-tracking system wherein a link-tracking server receives a user selection of a link, thereby comprising a request for a page or an image, such that the user request includes link-tracking information, which is then stored in one or more link-tracking files to record information about the selection of the link. A link-tracking subscriber may access information contained in these link-tracking files, such as by logging onto the link-tracking server. To capture link-tracking information in any Web page, a content provider embeds link-tracking code in that Web page. The Web pages embedded with such link-tracking code are then stored in a content provider server, which then serves such tracking-enabled Web pages to users on the network upon request. When a user requests a tracking-enabled page or image, the content provider server responds to the link-tracking code by sending one or more corresponding requests to a link-tracking server, to automatically record link-tracking information for each link selected by the user.

Other features and advantages of the present invention are apparent from the following description of the preferred embodiment, which illustrates, by way of example, the principles of the invention.

BRIEF DESCRIPTION OF THE DRAWINGS

FIG. 2A and FIG. 2B show an exemplary embodiment of code embedded in a Web page to utilize link tracking in accordance with the present invention.

FIGS. 4A, 4B, and FIG. 4C show an alternative exemplary embodiment of code embedded in a Web page to utilize link tracking in accordance with the present invention.

DETAILED DESCRIPTION

Figure 1:
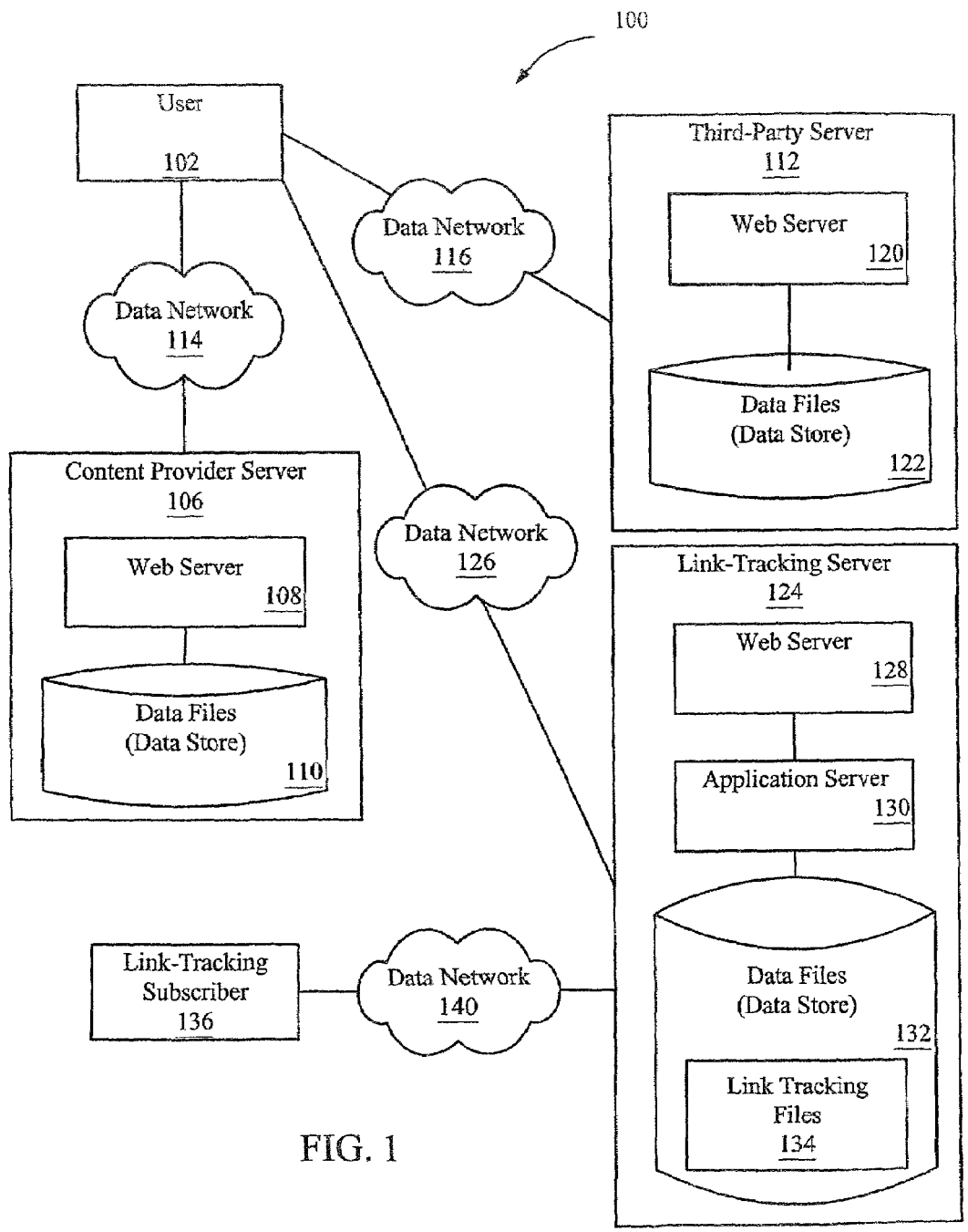
FIG. 1 is a block diagram of a system that provides link-tracking in accordance with the present invention.

FIG. 1 is a representation of a link-tracking client-server system 100 that provides link-tracking information, in response to a request from a network user's action, in accordance with the present invention. The system 100 thereby functions as an intelligent link-tracking system that captures or records link-tracking information in relation to links to files, including Web pages and downloaded files, such as links clicked, link paths, exit links (i.e., links or Web pages that transferred the user to another Web site or Web page), entrance Links (or referring links, i.e., links from which the user was referred to the particular Web page), click-thru percentage, most popular links, location of links within a window, popular text links, popular banners, most popular test links and banners, number of times a file has been downloaded, types of downloaded files, location or URL of downloaded file, forms or Web pages filled out, and the like.

In the system 100, a network user at a computer 102 having a graphical user interface (GUI) browser program gains access to content by contacting network nodes, file servers, or Web servers of content providers. A content provider server 106, also a computer, also includes Web server software 108 that responds to requests from users as well as handles the sending of responses back to the appropriate users, and a data store 110 that contains data files that are used to respond to such requests. The content provider server 106 may also comprise a database server, which contains information, for example, to generate dynamically generated Web pages and the like. Such information may also be stored in the data store 110. The data store may also contain scripts that implement the features and functions of the content provider's Web site. In this way, the content provider server 106 provides a typical Web site that contains Web pages requested by users from a network such as the Internet. The pages contained in the content provider server 106 may also contain links to pages or Web sites of other third parties, such as sponsoring advertisers, as shown by the third party computer servers 112.

The user 102 is connected to the content provider server 106 via a data network 114, such as the Internet, a communications network, a local area network, a value added network, a private virtual network, and the like. The network connection may be wireless or wired. In order to retrieve the requested pages through links contained in pages stored in the content provider server 106, the user should also have a connection to the third party server 112 via a data network 116. The third party server 112, similar to the content provider server 106, is typically a computer that executes Web server software 120 and includes a data store 122.

The content provider server 106, which is the server whose pages are monitored for link-tracking information, is connected to a link-tracking server 124 via a data network connection 126. The link-tracking server 124 executes Web server software 128, and includes an application server 130 and a data store 132. The data store 116 also contains the link-tracking files 134 with the link-tracking information. The link-tracking files may be stored in a relational database management system (RDBMS), such as "SQL Server" by Microsoft Corporation of Redmond, Wash., USA, or "ORACLE® 8i" by Oracle Corporation of Redwood Shores, Calif., USA. The data store 132 may also contain various data files, including scripts or programs containing the instructions to record the link-tracking information to the link-tracking files or to generate various link-tracking statistics or reports requested by the link-tracking subscriber 136. Such scripts or programs are run or executed by the application server 130. The link-tracking reports or statistics may list the most popular links, banner ads with the highest click-thru percentage, and the like.

The application server 130 may also run other programs, such as programs to dynamically generate pages of link-tracking statistics. The application server therefore not only runs the program(s) to record link-tracking information to the link-tracking files 134, but also runs the program(s) to enable the link-tracking subscriber 136 to obtain various link-tracking statistics and reports. The content provider 106, third party server 112, and link-tracking server 124 may also contain other modules not illustrated in the FIG. 1 diagram, such as application servers, RDBMS, and the like.

A link-tracking subscriber 136, who subscribes to the link-tracking system 100 to monitor pages at one or more Web sites, is connected to the link-tracking server 124 via a data network 140. The link-tracking subscriber usually is given access to view or obtain information from the link-tracking files 134 only after properly logging into the link-tracking server 124, such as by supplying an account number and a password. In this way, only authorized subscribers will have access to the link tracking information.

The user 102, content provider server 106, third party server 112, link-tracking server 124, and the link-tracking subscriber 136 may all be connected to the same data network, such as the Internet. Such data network connections may be provided via conventional phone lines, wireless connections, high-speed dedicated lines, or other data network connections. The content provider server 106, the third party server 112, and the link-tracking server 124 may also be contained in one or in a plurality of computers. Variations on the network connections as well as the embodiment of the various servers will be well-known in the art.

In the preferred embodiment, the user requests for pages or files are sent using the HTTP specification. However, other requests such as RTP (real-time protocol), FTP (file transfer protocol), may also be employed in the present invention. Those skilled in the art will appreciate that the HTTP specification mandates that a user request for a network file (a Web page) will include information about the user computer platform, such as operating system, browser version, the Web page from which the request was made (called the referring domain), and the user's Internet protocol (IP) address on the network.

FIG. 2A and FIG. 2B together illustrate an exemplary embodiment of programming code that provides link-tracking in accordance with the present invention. The line numbers shown are not part of the code but are included for reference in the following discussion. The entire code listing spanning FIG. 2A and FIG. 2B (lines 1 through 47) will be collectively referred to as FIG. 2. Comment phrases set off by "//" or "<!--" refer to preceding lines of code.

The code listed in FIG. 2 is embedded within each page that is to be monitored by the link-tracking server 124. In an HTML file, for example, the embedded code is preferably placed in Web page code between the start body tag of the Web page, corresponding to "<body>", and an associated end body tag, corresponding to "</body>". Similarly, any dynamically generated Web page also has this code embedded within the body of the HTML file. If other file formats are used, such as XSL and XML, the end resulting page includes this code within the body of such file.

In accordance with the present invention, click-through events on links are tracked without adding any code to the link itself beyond specifying an image source file, as described further below. The FIG. 2 code automatically creates an on-click event for each link on a page when that page is loaded by the user's browser. When the user clicks on a link, data comprising the URL of the linked page is automatically reported to a link-tracking server. In addition, as described further below, the data reported may include any text or HTML code that is included in the referring page between starting and ending reference <A> HTML tags. This permits a link to be associated directly with an image or section of text and to separately track, for example, exit links from a page.

More particularly, when a requested page is initially delivered to a user's browser, thereby being loaded into the browser's window, the embedded code (more particularly, the code at line 41) instructs the user's browser to execute the initial function, called "function initial" and listed at lines 24 to 39, to create an array containing, pointing, or otherwise referencing all the links contained on the requested page. That is, when the requested page is loaded into the user's browser, the loaded code includes lines 2 through 43, specifying a JavaScript code that specifies the "function initial" and carries out the processing. The code does this by searching for tags that indicate links such as anchor tags, which are identified with the start and end tags, <a href> and </a>, respectively, that are well-known to those skilled in the art. Such links may be text or images. Variations on how such tags are written are well-known in the art.

The FIG. 2 code is also written such that a request to record link-tracking information is sent to the link-tracking server 124 when an appropriate event occurs, such as mouse on-click or on-submit events. This is shown by the "recordit" function that is listed at lines 3 to 21 of the FIG. 2 code. An on-click event occurs when a user clicks on a link, while an on-submit event occurs when the user selects a "submit" display button, or some other appropriate button selected by the content provider. Other user mouse events used to monitor link-tracking information may also be used to send information to the link-tracking server 124.

Web pages, particularly those written using HTML, can include code, such as an HTTP image tag, that causes an Internet browser to automatically request a file from an identified Internet server. In the case of an image tag, the requested file is called an image source file. The "image source file" need not only contain image data but may also be connected to a script that is run when such file is requested. In another embodiment constructed in accordance with the invention, the requested "image source file" does not contain any image data, thus a request for such an image source file does not result in an image being returned to the user. An empty "image source file" such as this, however, may be connected to a script or program that is run when the image source file is requested.

In accordance with the present invention, an image source file will be requested from a link-tracking server 124. The script connected with such image source file request is then run through the user's browser, and the image data that was requested, if any, is sent back to the user 102. Cookies may also be sent by the link tracking server 124 to create new cookies or update existing cookies contained in the user's computer 102. Those skilled in the art will understand that a cookie is a data structure that is written to datastore of a browser computer by server-side processing when the user visits an Internet Web site.

In the exemplary illustration, the image source file is requested from a predetermined server such as the http://ww3.hitbox.com/logs/log.cgi server, which as illustrated by the code at lines 18 and 19 in FIG. 2 functions as a link-tracking server 124. The image source file is requested by the user's browser following the on-mouse or on-submit event. This request for the image source file, in addition, triggers the application server 130 to run the scripts or programs to record the link-tracking information, which may be passed by the user browser as part of the URL address as header information, and/or as cookies to the link-tracking server 124. The image source file, specified by the text string "http://ww3.hitbox.com/logs/log.cgi" of lines 18 and 19, may be replaced by the URL of any image source file available from the link-tracking server 124, so long as that image source file also triggers the recordation of the link-tracking information into the link-tracking files. The image source file requested typically depends on the domain name of the link-tracking server 124. The "IMG SRC" tag shown on line 45 of FIG. 2 is used to initialize the name of the image used to send the link-tracking request, in this case "hitboximage". It may or may not contain image data and may be replaced by the URL of any image source file available.

Link-tracking information may be captured in a number of ways. For example, the JavaScript programming language treats links as objects or link controls having certain properties. By retrieving or reading the properties of a link control, link-tracking information such as the URL address may be obtained. In conjunction with the JavaScript language, the features and functions of the Web browser and the operating system of the user's computer, and other link-tracking information such as date and time when a particular link was clicked, may be captured and sent to the link-tracking server 124.

In the preferred embodiment, the link-tracking code also takes into account other code written by the developers of the content provider, such that code written by such developers to handle certain events not related to the link-tracking system are not overwritten by the link-tracking code. This may be accomplished, for example, by ensuring that instructions contained in the link-tracking code are executed before other instructions.

The link-tracking code is also preferably written such that whenever the link-tracking server 124 is inoperative or inaccessible, the request for the page as selected by the user via a link may still be received at the content provider server. Thus, using the code listed in FIG. 2, when a user clicks on a link, the request to the link tracking server 124 (that is, the request for the image source file) is immediately sent and the instructions to record the link-tracking information are immediately run. Immediately after the request for the image source file is sent, the new page is requested from the content provider 106 via the link and the page is loaded into the user's browser. Thus, even if the request to the link tracking server 124 fails for an error or otherwise times out, the page requested from the content provider 106 via the link is not precluded from loading properly.

The code of FIG. 2 is an example of code written as a JavaScript module to provide features in accordance with the present invention. It should be understood, however, that other client-side scripting languages, such as Java applets or scripts written in accordance with Visual Basic from Microsoft Corporation, may also be used to code the link-tracking code described herein. Variations of the code listed in FIG. 2 may also be provided without affecting the functions and features described herein with respect to the present invention.

Figure 3:
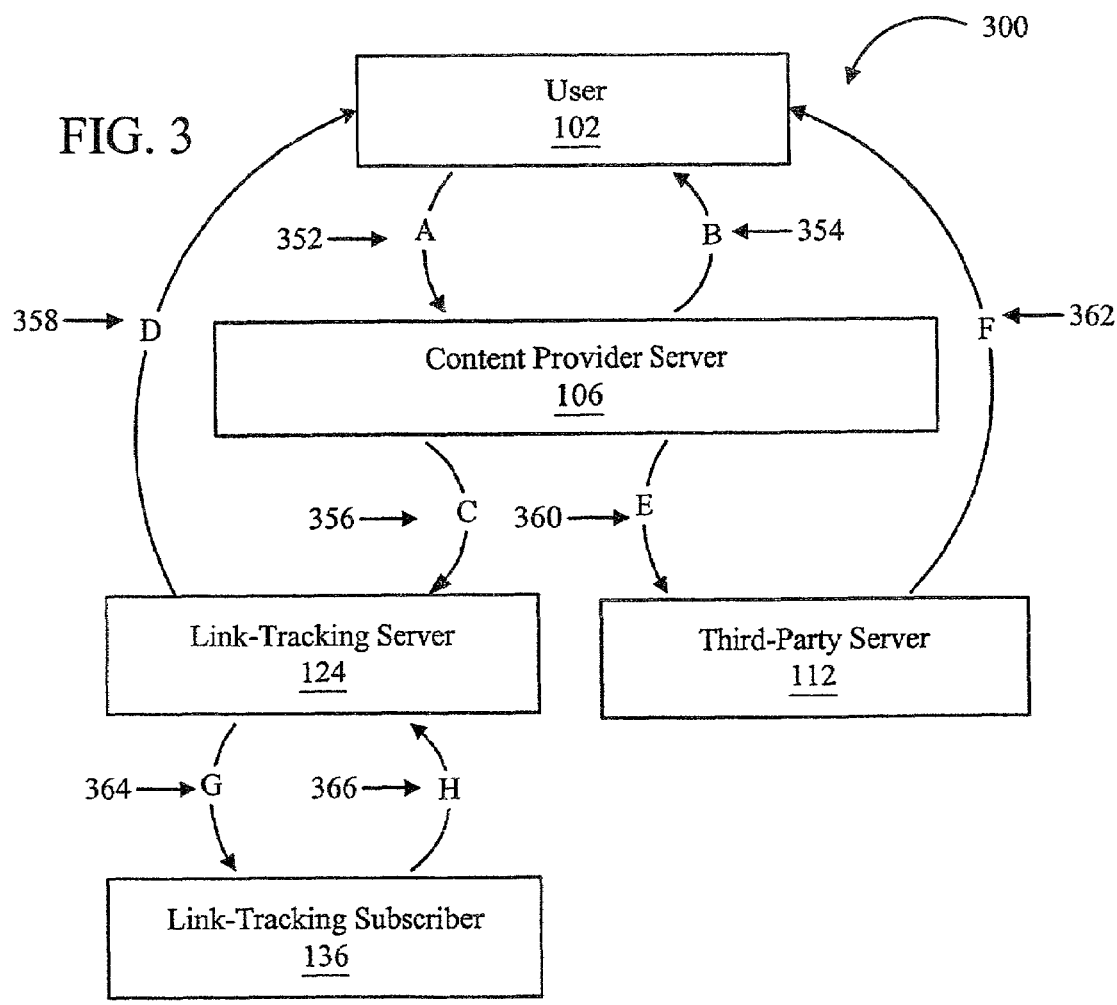
FIG. 3 is a data flow diagram illustrating the flow of requests and responses among the computers illustrated in FIG. 1.

FIG. 3 illustrates the data flow between the subsystems or computers illustrated in FIG. 1. Before the features of the link-tracking system 100 can be employed, a developer or a programmer embeds a link-tracking code, for example the code illustrated in FIG. 2, in each of the pages that the developer wants the link-tracking system to monitor. Such pages are also referred to as tracking-enabled pages. These tracking-enabled pages are then uploaded to the content provider server 106, which stores and serves such tracking-enabled pages. Existing Web sites thus require little modification to provide features in accordance with the present invention. Furthermore, link-tracking code may be automatically embedded in pages via a simple program that inserts such code before the end body tag, </body>. In this way, the developers of a Web site need not change the way they write or code their Web pages and upload them to a content provider server 106.

The user 102, via a browser, requests a page from the content provider server 106, as shown by the arrow A 352, via a data network 114 (FIG. 1). The user does this by typing the URL of the Web page or by clicking on a Web page already displayed in the browser's window. A user may also request multiple Web pages, for example, by requesting a window containing one or more frames. The link-tracking code may also be embedded in each frame within a page.

The content provider server 106 then receives the request and sends the appropriate tracking-enabled page, as a response, back to the user's browser, as shown by the arrow B 354, via the data network 114 (FIG. 1). Using features that are built-in to conventional browsers, the user's browser renders and displays the tracking-enabled page that was received. The link-tracking code is then read and run by the Web browser, e.g., at line 41 of FIG. 2, which then runs the initial function, illustrated by lines 24 to 39 in FIG. 2. The initial function creates the array containing, pointing, or referencing the links contained in that received Web page. In this way, the user's browser then "knows" what to do for each of the link-tracking enabled links on the received "image source" page.

When the user clicks on a link within a tracking-enabled page, the link-tracking code is triggered, particularly the recordit function, at lines 3 to 21 of FIG. 2, as discussed above. The source image file request, i.e., at line 45 (FIG. 2), is then sent from the user's browser to the link-tracking server 124, as shown by the arrow C 356, via the data network 126 (FIG. 1). In addition to the source image file request being sent, other information may be provided to the link-tracking server 124, such as cookies, header information, and/or URL addresses. For example, the account number of the Web site may be sent, including other link-tracking information.

The link-tracking server 124 then reads the request, including cookies, header information, and/or URL address, and records the appropriate link-tracking information into one or more event tracking files 134. The link-tracking subscriber 136 may later retrieve such link-tracking information. The link-tracking server 124 then sends the image data requested (response), if any, including the updated cookies, back to the user 102, as shown by the arrow D 358 in FIG. 3, via the data network 126 (FIG. 1).

Immediately after the image request to the link-tracking server 124 is sent (arrow C 356), the user's browser 102 also sends the new request (i.e., the link clicked by the user) to a third party server 112, as shown by Arrow E 360, via the data network 116 (FIG. 1). Such new request may occur a split second after the request to the link-tracking server 124. The third party server 112 then sends the requested page or pages (contained in the link) as a response to the user 102 via the data network 116, as shown by the arrow F 362 in FIG. 3. The user browser's then loads and renders the Web page received.

The third party server 112 may be any Web server on a data network, such as the Internet. The third party server may also function as the content provider server 106 and the link-tracking server 124, because links contained in tracking-enabled pages may refer to those Web pages contained in the content provider server 106 or in the link-tracking server 124. Web pages requested from third party servers 112 may also be tracking-enabled and may be located at those servers.

If the link-tracking subscriber wishes to determine the statistics of the content provider server 106 related to the link-tracking subscriber, such subscriber may do so by logging into the link-tracking server 124, for example, by supplying the proper account number and password, and requesting Web pages showing the statistics or link-tracking information of the monitored Web pages. Requests for such information are shown as the arrow G 364. The link-tracking server 124 responds to the link-tracking subscriber's 136 requests by sending the appropriate Web pages back to the link-tracking subscriber 136, as shown by the FIG. 3 arrow H 366, via the data network 132.

The link-tracking server 124 may arrange the information contained in the link-tracking files 134 in many ways, for example, by domain name or account number. Various slices, views, and formats of the event tracking files may be presented to the link-tracking subscriber.

While the above description describes a single computer each acting as a link-tracking server 124, a content provider server 106, and a third party server 112, they can be distributed over a plurality of computers. The link-tracking server 124 may also monitor more than one content provider server 112. The link-tracking code may also be designed such that instead of a image source file being requested, the request is replaced with a request for a script, such as a CGI (common gateway interface) or a script provided by a format such as "Cold Fusion", which stores the link-tracking information into the link-tracking files 126.

The various requests and responses, as shown by Arrows A, B, C, D, E, F, G, H in FIG. 3 are typically HTTP requests or responses. However, other requests and responses, such as RTP and FTP, may also be used. Other techniques to send and receive requests or responses, such as sending e-mail to the link-tracking server 124 containing link-tracking information, may also be employed. A program contained in the application server 130, for example, then searches its email box for e-mail with a specific subject line. The program then reads the contents of the e-mail and accordingly creates or updates the link-tracking files 134 with new link-tracking information.

For example, FIG. 4 (comprising FIG. 4A, FIG. 4B, and FIG. 4C) illustrates a preferred embodiment of a system constructed in accordance with the invention, wherein the types of links that will be processed may be restricted. That is, the content provider may select the type of files to be excluded from the link-tracking processing that otherwise would be performed. This permits the link tracking data being reported to include any text or HTML code that is included in the referring page between starting and ending reference "<A>" HTML tags. This permits a link to be associated directly with an image or section of text and to separately track, for example, exit links from a page.

The FIG. 4 code to provide the added functionality includes a new function, called "_gf(_x)". This function (lines 7 through 13 of FIG. 4) will extract the file name of a page requested in a URL from a link. In particular, those skilled in the art will understand that this function finds the three-letter domain name extension of a URL, such as "*.com", "*.org", and the like. The operation of the function then determines that the text immediately preceding the domain name extension is the top-level domain name itself. As explained further below, isolating the domain name helps identify exit links.

Another new function illustrated in FIG. 4 is the "_sb(_k)" function, which determines if the domain name of a page requested in a URL link is different from the domain name of the referring page, thereby indicating an exit link. This function is specified at lines 15 through 29 of FIG. 4. As illustrated therein, the URL is parsed to identify the domain name, after stripping off the three-letter domain suffix (com, org, etc.) and stripping off any two-letter country code abbreviations. A link that refers the user to a domain other than the domain of the currently viewed page is, by definition, an exit link.

Another new function illustrated in FIG. 4 is the "_ri(_k, _w)" function, which determines if a link is to a download location. This is determined by parsing the name of the source file requested by the user and checking the requested URL file name against known file extensions that indicate a page viewing rather than a file download. For example, the known HTML-type file extensions may include *.asp, *.jsp, *.cgi, *.dll and the like, such as specified in lines 42 and 43 of FIG. 4. If the name of the requested file does not contain one of the enumerated HTML file extension types, then the file information (comprising the link data) is passed to the link tracking servers (line 45). The code otherwise causes the browser to check for exit links by executing the code previously described. In this way, the link-tracking system permits more precise tracking of click through data and permits identification of enumerated file types.

One skilled in the art will recognize that variations in the steps, as well as the order of execution, may be performed without departing from operation in accordance with the features of the invention. For example, with respect to the FIG. 4 code, the enumerated file types may comprise file extensions other than HTML types, and may comprise any file extension that may be of particular interest to link-tracking service subscribers.

The present invention has been described above in terms of a presently preferred embodiment so that an understanding of the present invention can be conveyed. There are, however, many configurations for a link-tracking system not specifically described herein but with which the present invention is applicable. The present invention should therefore not be seen as limited to the particular embodiments described herein, but rather, it should be understood that the present invention has wide applicability with respect to link-tracking generally. All modifications, variations, or equivalent arrangements and implementations that are within the scope of the attached claims should therefore be considered within the scope of the invention.

What is claimed is:

1. A method of capturing link-tracking information from a network user, the method comprising the steps of:
   requesting a Web page content from a content provider server via a data network;
   receiving a tracking enabled Web page via the data network, wherein the tracking enabled Web page contains a link tracking code that initializes an initial function which creates an array of links contained in the received tracking enabled Web page, at least a first and a second of the links in the array of links associated with a same uniform resource locator (URL) in the received tracking enabled Web page;
   determining a domain name of the received tracking enabled Web page;
   receiving a selection of the first link in the array of links;
   determining a domain name of the selected first link;

comparing the domain name of the received tracking enabled Web page to the domain name of the selected first link to determine if they are the same; and sending a link tracking request and the array of links to a link tracking server via the data network, wherein the link tracking request corresponds to the selected first link;

indicating an exit link in the link tracking request if the domain name of the received tracking enabled Web page and the domain name of the selected first link are not the same; and sending a Web page content request to a content provider server, wherein the Web page content request corresponds to the selected first link.

2. The method of claim 1, wherein receiving a selection of the first link comprises:

monitoring user input for an action related to a link in said array of links; and identifying a user action related to a link in said array of links.

3. The method of claim 1, wherein the tracking enabled Web page further comprises a recording function configured to record user actions related to said array of links, wherein sending a link tracking request comprises executing said recording function.

4. The method of claim 1, wherein sending the link tracking request to the link tracking server comprises sending one or more cookies to the link tracking server.

5. The method of claim 1, further comprising providing from the link tracking server link tracking statistics to a link tracking subscriber.

6. The method of claim 1, further comprising providing from the link tracking server link tracking reports to a link tracking subscriber.

7. The method of claim 1, wherein the link tracking code is received via a hyper text transfer protocol communication.

8. The method of claim 1, wherein the initial function creates the array of links by searching the Web page content for anchor tags identified with start and end tags.

9. A method of capturing link-tracking information from a network user, the method comprising the steps of:

requesting a Web page content from a content provider server via a data network;

receiving a tracking enabled Web page via the data network;

parsing the tracking enabled Web page to identify a link tracking code;

identifying an initial function based on the link tracking code;

creating an array of links contained in the received tracking enabled Web page using the initial function;

obtaining a uniform resource locator (URL) for the received tracking enabled Web page;

extracting a domain name for the tracking enabled Web page from the URL;

receiving a selection of a link in the array of links;

obtaining a URL for the selected link;

extracting a domain name from the URL for the selected link;

sending a link tracking request and the array of links to a link tracking server via the data network, wherein the link tracking request corresponds to the selected link;

sending a Web page content request to a content provider server, wherein the Web page content request corresponds to the selected link;

comparing the file name corresponding to the domain name for the tracking enabled Web page with the file name corresponding to the domain name for the selected link; and indicating an exit link in the link tracking request if the file name corresponding to the domain name for the selected link is not the same as the file name corresponding to the domain name for the tracking enabled Web page.

10. The method of claim 9, wherein the step of extracting a file name corresponding to a domain name for the tracking enabled Web page comprises searching for a string including a ".com," a ".net," or a ".org."

11. The method of claim 9, further comprising the steps of:

determining a domain name of the selected link and the tracking enabled Web page;

stripping off a domain name suffix from the domain name of the selected link and the tracking enabled Web page;

stripping off a country code abbreviation from the domain name of the selected link and the tracking enabled Web page;

comparing the stripped off domain name of the received tracking enabled Web page to the stripped off domain name of the selected link to determine if they are the same; and indicating an exit link in the link tracking request if the stripped off domain name of the received tracking enabled Web page and the stripped off domain name of the selected link are not the same.

12. The method of claim 9, further comprising the steps of:

extracting a file name corresponding to a selected file in the URL for the selected link;

comparing the file name to a plurality of known HTML extension types; and indicating a download in the link tracking request if the file name corresponding to a selected file in the URL for the selected link is not the same as one of the known HTML extension types.

13. The method of claim 12, wherein the known HTML extension types comprise a *.jsp extension type, a *.asp extension type, a *.cgi extension type, and a *.dll extension type.

14. The method of claim 9, further comprising the steps of:

receiving a request from a link tracking subscriber to establish a communicative coupling with the link tracking server via the data network; and providing information associated with the link tracking request to the link tracking subscriber.

15. The method of claim 14, wherein the step of receiving further comprises:

receiving a name for the link tracking subscriber; and receiving a password for the link tracking subscriber.

16. The method of claim 14, wherein the information associated with the link tracking request includes information in the tracking enabled web page between a starting reference HTML tag and an ending reference HTML tag.

17. The method of claim 9, wherein the tracking enabled Web page contains a non-link tracking code in addition to the link tracking code, the method further comprising executing the link tracking code before the non-link tracking code.

* * * * *